(12) United States Patent
Narayanan et al.

(10) Patent No.: US 8,452,747 B2
(45) Date of Patent: May 28, 2013

(54) BUILDING CONTENT IN Q AND A SITES BY AUTO-POSTING OF QUESTIONS EXTRACTED FROM WEB SEARCH LOGS

(75) Inventors: Priyesh Narayanan, Kerala (IN); Ashvin Agrawal, Indore (IN)

(73) Assignee: Yahoo! Inc., Sunnyvale, CA (US)

(*) Notice: Subject to any disclaimer, the term of this patent is extended or adjusted under 35 U.S.C. 154(b) by 106 days.

(21) Appl. No.: 12/876,724

(22) Filed: Sep. 7, 2010

(65) Prior Publication Data
US 2012/0059816 A1    Mar. 8, 2012

(51) Int. Cl.
*G06F 17/30* (2006.01)
(52) U.S. Cl.
USPC .......................... 707/706; 707/707
(58) Field of Classification Search
USPC ................................. 707/706, 707
See application file for complete search history.

(56) References Cited

U.S. PATENT DOCUMENTS

| | | | |
|---|---|---|---|
| 8,032,483 B1* | 10/2011 | Haveliwala et al. | 707/602 |
| 2003/0069880 A1* | 4/2003 | Harrison et al. | 707/3 |
| 2004/0243568 A1* | 12/2004 | Wang et al. | 707/3 |

* cited by examiner

*Primary Examiner* — Baoquoc N To
(74) *Attorney, Agent, or Firm* — Hickman Palermo Truong Becker Bingham Wong LLP (57) ABSTRACT

A search engine receives user-submitted queries, determines web pages that are relevant to those queries, and returns relevance-ranked lists of references to the relevant web pages. Additionally, the search engine adds each query's terms to a query log. An automated process asynchronously examines the log and locates questions therein. For each question so located, the process determines whether that question already is contained in a database of questions maintained by an online question-and-answer system that is separate from the search engine. For each such question that is not already contained in the stored database of questions, the process automatically adds that question to the question database. As a result, the set of questions used by the online question-and-answer system grows even in the absence of any further direct question submissions by users of the system.

20 Claims, 4 Drawing Sheets

BUILDING CONTENT IN Q AND A SITES BY AUTO-POSTING OF QUESTIONS EXTRACTED FROM WEB SEARCH LOGS

FIELD OF THE INVENTION

The present invention relates to collaborative knowledge systems and, more specifically, to a technique for building content in question-and-answer websites through the automatic posting of questions extracted from an Internet search engine's query logs.

BACKGROUND

Yahoo! Answers is an example of a community-based, Internet-accessible question-and-answer submission system that allows users all over the world to submit questions that other users all over the world can view and answer. Users of question-and-answer submission systems submit such questions and answers using an Internet Browser such as Mozilla Firefox. After a user (an "asker") has submitted a question, other users can read the question and, if they choose, submit an answer to the question. Question-and-answer submission systems typically allow users to see, along with a question, answers that have been submitted for that question, and the pseudonyms of the users (the "answerers") who submitted those answers. As more and more questions are submitted to the question-and-answer system, more and more other users are able to view those questions, and more and more answers eventually may be submitted for those questions.

Existing question and answer systems are somewhat limited in their abilities to collect questions to which members of the community can submit answers. Typically, the only way that a question becomes entered into the system is by a community member's direct submission of the question to the system. Although many other people might be seeking for answers to various questions, many other people who are not members of the question-and-answer community might not even be aware of the existence of the question-and-answer system. Consequently, these other people are not benefited by the question-and-answer system. Furthermore, because the questions that these other people in many cases will not end up being submitted to the question-and-answer system, such questions are likely to go unanswered by members of the community even if some members of the community might actually know answers to those questions.

The problems discussed above are not limited to question-and-answer submission systems. The problems discussed above are applicable to many different kinds of online systems in which submitters are allowed to submit user-generated content that becomes accessible by other users of those online systems. Collectively, such online systems may be called "social knowledge systems." For example, the problems discussed above also sometimes affect social knowledge system such as online bulletin board systems and online auction systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Users of Internet-accessible search engines sometimes supply, to those search engines, as query terms, questions whose answers those users hope to find in the search results that the search engines returns to those users. Indeed, it may be the case that users submit questions as query terms to a search engine much more frequently than users submit questions directly to any Internet-accessible question-and-answer system. Techniques described herein take advantage of this possibility in order to augment a database of questions maintained by such an online question-and-answer system.

According to one embodiment of the invention, an Internet-accessible computer-automated search engine receives, over the Internet, queries submitted by various users (typically through the Internet browser applications of those users). In response to the receipt of each such query, the search engine determines a set of Internet-accessible documents (or other media) that are relevant to that query. In response to each such query, the search engine returns, to the submitter of the query, over the Internet, at least one web page that contains a relevance-ranked list of references to the documents (or other media) that were determined to be relevant to that query. Additionally, for each such query, the search engine adds, to a stored query log, an entry that specifies the query terms that the user submitted.

Periodically, and/or in response to some event(s), and potentially asynchronously to the search operations discussed above, a computer-automated process executing in conjunction with the search engine examines the stored query log and locates queries that are, or could be, expressed as questions. Some previously submitted queries may be capable of expression as (and might already be expressed as) questions, while other queries might not be capable of expression as questions. For example, the process might locate query log records that contain (or, in an alternative embodiment, begin with) query terms such as "who," "what," "where," "when," "why," or "how." For another example, the process might locate query log records that begin with query terms such as "is," "do," "does," "has," "was," "can," "will," "did," "could," "would," "should," "which," or "whose." For another example, the process might locate query log records that conclude with a question mark. There are various techniques (those enumerated above being just a few) by which the process can determine which queries were expressed as, or were capable of being expressed as, questions.

For each inquisitive query log entry located using the operations set forth above, the process arranges the query terms specified in that query log entry into the form of a complete sentence that expresses an actual question and ends with a question mark; potentially, one or more of the located query log entries already are arranged into such a form. The process determines, for each such formally expressed question, whether that question already is contained in a stored database of questions maintained by an online question-and-answer system of the kind discussed in the Background section. For each such question that is not already contained in the stored database of questions, the process automatically adds that question to the stored database of questions. As a result, the set of questions used by the online question-and-answer system grows even in the absence of any further direct question submissions by members of the system.

Questions that were previously submitted as query terms to an Internet search engine (rather than directly to any component of the separate online question-and-answer system) then become as available to users of the question-and-answer system as if those questions had been submitted directly to the online question-and-answer system. Users of the online question-and-answer system can view questions added to the system's database in the above manner. Additionally, members of the online question-and-answer system can submit answers to such questions. Such answers are associated with the questions to which they relate in the system's database. Such answers may be displayed along with their associated questions whenever the system presents those associated questions to users of the online question-and-answer system.

Thus, using techniques described herein, the online question-and-answer system's question database is supplemented using a source of information that was not previously exploited for that purpose. The use of previously submitted Internet search engine query terms as a source of questions beneficially enriches the online question-and-answer system, and improves the user experience thereof.

Although embodiments of the invention are described in the context of the augmentation of an online question-and-answer submission system's question database, embodiments of the invention also may be applied to other online social systems. For example, questions harvested from search engine query logs may be submitted as posts to an online bulletin board system. For another example, questions harvested from search engine query logs may be included as text in dynamically generated advertisements that are to be displayed on web pages presented by online social community systems (e.g., Facebook, MySpace, etc.).

Example System

Figure 1:
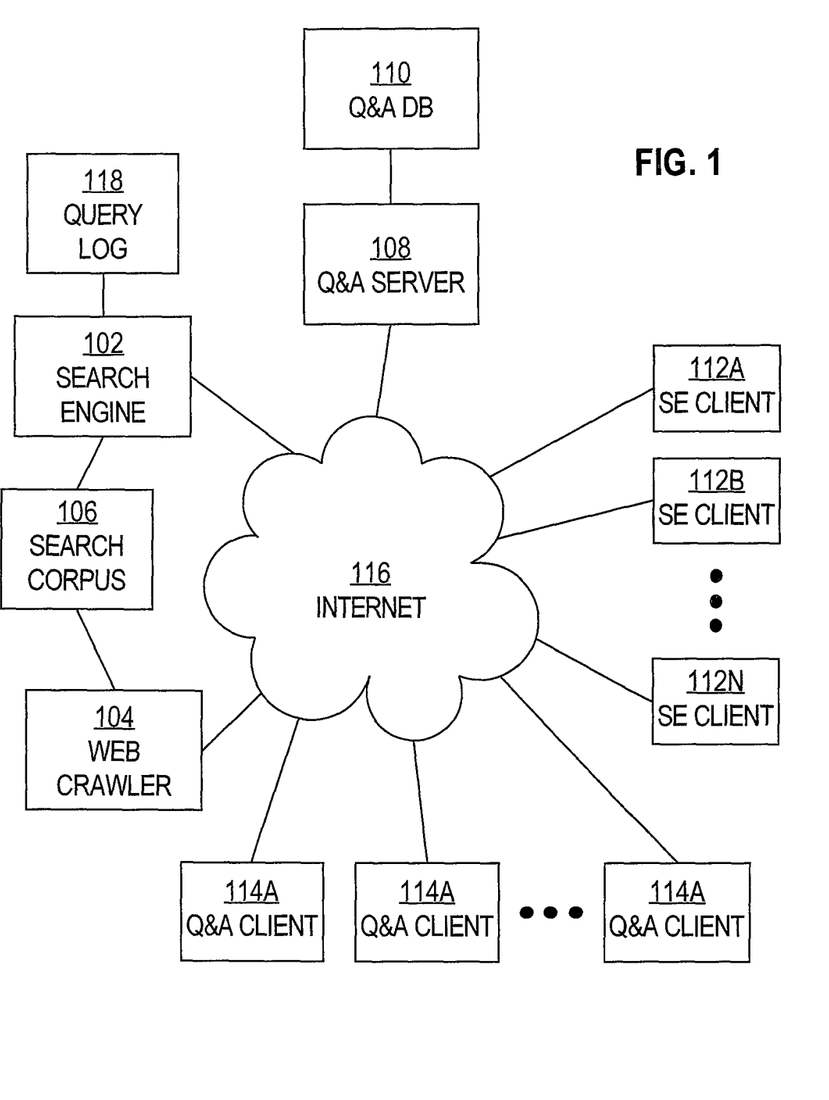
FIG. 1 depicts an example of a system in which an embodiment of the invention may be implemented.

FIG. 1 depicts an example of a system in which an embodiment of the invention may be implemented. The system of FIG. 1 includes a search engine 102, a web crawler 104, a search corpus 106, a question-and-answer (Q&A) server 108, a question-and-answer database (Q&A DB) 110, search engine (SE) clients 112A-N, query log 118, question-and-answer system (Q&A) clients 114A-N, and the Internet 116.

Web crawler 104 is an automated process that continuously executes on one or more computers that are connected to and have access to Internet 116. Multiple instances of web crawler 104 may execute concurrently, and these may cooperate in a parallel manner. Web crawler 104 follows links between web pages and other resources that web crawler 104 automatically discovers on Internet 116. For example, web crawler 104 may locate a page that contains ten different hyperlinks to 10 other different web pages on Internet 116. Web crawler 104 may responsively add the Uniform Resource Locators (URLs) referenced by each such link to a queue of web pages to which web crawler 104 will navigate in the future, performing the same link-following operations with regards to each of the web pages found at those URLs. Generally speaking, web crawler 104 navigates to a URL by requesting a resource (e.g., web page) to which that URL refers over Internet 116 from a web server that hosts or serves that resource.

As web crawler 104 follows hyperlinks from web page to web page, web crawler 104 adds the URL of each discovered web page to search corpus 106. In doing so, web crawler 104 indexes each such web page by each of the words that are found in that web page. Thus, web crawler 104 progressively and continuously builds an index on search corpus 106, in which each web page in the corpus has its own entry that also indicates each word that occurs in that web page. By making use of this index, search engine 102 is capable of quickly locating, in the search corpus, each URL that is associated with any word that is contained in a user-submitted query. For each web page that web crawler 104 discovers via its automated crawling, search corpus 106 reflects the entire contents of that web page. In addition to a "forward" index that indicates each word that is contained in a particular web page referenced by a particular URL, an "inverted" index also may be concurrently or later built or updated. This "inverted" index indicates, for each word that is contained in any entry in the forward index, a list of URLs of web pages that contain that word. Within the inverted index, a particular word's entry might be associated with a list of many different URLs.

SE clients 112A-N are operated by various different users at different times and from different locations. Each of SE clients 112A-N executes on a separate computer. For example, various ones of SE clients 112A-N may be any of a number of different Internet browsing applications, such as Mozilla Firefox, Microsoft Internet Explorer, etc. These browsing applications generally make Hypertext Transfer Protocol (HTTP) requests over Internet 116 to web servers that serve or host resources in which the users or SE clients 112A-N are interested; such requests usually identify a URL of the resource (e.g., web page) of interest. These URLs are translated into Internet Protocol (IP) addresses of the web servers that host the resources of interest. The IP addresses are used to route the HTTP requests over Internet 116 to the appropriate web servers. When the web servers receive such HTTP requests, the web servers form HTTP responses that contain the resources of interest. The web servers then send these HTTP responses back over Internet 116 to those of SE clients 112A-N from which the corresponding HTTP requests originated. Upon receiving the HTTP responses over Internet 116, the SE clients 112A-N render and display the resources represented therein to the users of SE clients 112A-N. Often, such rendering involves interpreting and/or executing Hypertext Markup Language (HTML) or other markup text or executable script (e.g., Javascript) to produce images and text that are fit for human viewing.

Among the web servers to which SE clients 112A-N might make requests is search engine 102. Search engine 102 is associated with a particular URL (e.g., www.yahoo.com) that usually will be well-known to users of SE clients 112A-N, such that these users can enter the particular URL into the navigation field of those SE clients 112A-N in order to cause those clients to request a "front page" from search engine 102. Upon receiving a request from any of SE clients 112A-N over Internet 116, search engine 102 generates and returns a "front page" web page over Internet 116 to those of SE clients 112A-N from which the request originated. Typically, among possible other features that might be contained on the front page, a query term entry field will be prominently presented. When any of SE clients 112A-N receives the front page from search engine 102, that client renders the front page, including the query term entry field, to the user of that client. Using his computer's keyboard or other input devices (e.g., a microphone into which words may be spoken), the client's user then may enter, into the query term entry field, one or more query terms that reflect one or more topics of interest to the user. These query terms indicate subjects of resources in which the user is interested. Search engine 102 also may suggest query terms to the user based on various factors such as previous similar queries that other users previously have submitted to search engine 102; such previously submitted queries may be stored and retrieved from query log 118. After the user is satisfied with the query terms that the user has placed into or selected via the query term entry field, the user may provide input that indicates that the user has completed the formation of his query. This input often comes in the form of the user mouse-clicking on a button, presented on the front page proximately to the query term entry field, which is labeled "SUBMIT" or the like.

Upon the receipt of such query-completion-indicating user input, the one of SE clients 112A-N that received that input sends, over Internet 116, to search engine 102, an HTTP request that indicates the query terms that the user placed within the query term entry field. Search engine 102 receives the query terms and compares the query terms against entries within the indices that web crawler 104 built (and continues to build) on search corpus 106. Search engine 102 determines, for each query term in the set of submitted query terms, a set of resources (e.g., web pages) that contain that query term. For example, search engine 102 might use the inverted index discussed above to determine the set of web pages in search corpus 106 that are known to contain a particular query term; in the inverted index, that set of web pages is indicated by the web page list that is mapped to that particular query term's index entry, in which the particular query term itself is key (the entries within such an inverted index typically will be sorted using the query term as a sort key, and a quick search such as a binary search may be used to locate the desired entry quickly). Thus, if a particular query contained three different query terms, then search engine 102 might determine three different sets of web pages using the indices built on search corpus 106: a first set that contained the URLs of web pages that contained the first query term, a second set that contained the URLs of web pages that contained the second query term, and a third set that contained the URLs of web pages that contained the third query term. Search engine 102 then determines the intersection of each of these sets, which contains only the URLs of those web pages that contain all of the query terms. This intersection is referred to below as the "final set."

After determining this final set for a particular query, search engine 102 ranks the URLs, or the web pages to which those URLs refer, within that set relative to each other. The ranking may be based on a variety of factors, some of which might be based on the query terms and some of which might not be based on the query terms. Typically, web pages that contain a greater quantity of instances of the query terms will be ranked more favorably than web pages that contain a relatively lesser quantity of instances of the query terms. Other factors, such as the quantity of other web pages that contain hyperlinks to a particular web page that contains the query terms ("inlinks"), and/or the quantity of other web pages to which hyperlinks contained in the particular web page refer ("outlinks"), also may be used as at least a partial basis for determining the particular web page's rank.

After the URLs, or the web pages to which those URLs refer, have been ranked relative to each other, search engine 102 generates an initial search results page that indicates, among possible other features, references to URLs from a subset of the "N" highest-ranked URLs from the final set, where "N" is some administrator-specified number. Each URL may be represented in the initial search results page by a separate search result listing. Each search result listing may indicate, among possible other information, (a) the URL of the resource to which the listing pertains, (b) a title of the web page to which that URL refers, and (c) a summary—which might be extracted as a static block from that web page or dynamically generated based on text surrounding the instances of the query terms within that web page—which generally represents a short "preview" of the topics to which that web page pertains. The URLs in each search result listing typically are formatted as hyperlinks on which an SE client user can mouse click in order to command his SE client to request, over Internet 116, the web page to which those hyperlinks refer. After generating the initial search results web page in this manner, search engine 102 returns the initial search results web page over Internet 116, as an HTTP response, to the one or SE clients 112A-N from which the corresponding HTTP request (which indicated the query terms) originated.

Additionally, whenever search engine 102 receives query terms from any of SE clients 112A-N, search engine 102 determines whether query log 118 already contains an entry for all of those query terms together, in the order in which those query terms were received. In this respect, a query such as "the quick brown fox jumped over the lazy dog" would qualify as a different query from "the lazy dog jumped over the quick brown fox," even though both queries contain the same terms, but in a different order; the different ordering of the terms causes the queries to qualify as different queries. If search engine 102 determines that query log 118 does not yet contain an entry for a particular query that search engine 102 received from one of clients 112A-N over Internet 116, then search engine 102 creates a new entry for that query within query log 118. That entry specified the query terms, in the order in which they appeared in the received query. Alternatively, if search engine 102 determines that such an entry for the query already exists, then search engine 102 may merely increment a counter that is associated with that query log entry, to indicate the quantity of times that the same query has been received. Thus, the query log 118 contains a list of queries previously submitted to search engine 102. Some of these previously submitted queries might be in the forms of questions, and others of these queries, while possibly not exactly in the forms of questions already, might be capable of expression as questions with some manipulation. A special use of these question-representing queries to build question-and-answer content will be described further below, but first the general operation of an Internet question-and-answer system will be described with reference to FIG. 1.

Q&A clients 114A-N are operated by various different users at different times and from different locations. Each of Q&A clients 114A-N executes on a separate computer. The computers on which Q&A clients 114A-N execute may be separate from the computers on which SE clients 112A-N execute, although there may be some overlap between the two sets, due to some users of search engine 102 also being users of the Q&A system provided through Q&A server 108. Various ones of Q&A clients 114A-N may be any of a number of different Internet browsing applications, such as Mozilla Firefox, Microsoft Internet Explorer, etc. In at least one embodiment, at least one user of Q&A clients 114A-N does not also use search engine 102.

Users of Q&A clients 114A-N instruct these clients to request "front pages" from Q&A server 108 over Internet 116. In one embodiment of the invention, Q&A server 108 is a web server that receives HTTP requests and responds with HTTP responses over Internet 116. In response to receiving an initial HTTP request from one of Q&A clients 114A-N, Q&A server 108 may return, to the client, a web page that welcomes the user of that client to the Q&A system, and invites the user to search for an existing question (and accompanying user-submitted answers) and/or to submit a new question to the Q&A system.

One or more web pages that Q&A server 108 sends to Q&A clients 114A-N may contain a text entry field into which users of Q&A clients 114A-N may enter and submit questions. Upon the clients' users' activation of a control such as a "SUBMIT" button, which may be located proximately to the text entry field, Q&A clients 114A-N submit the contents of the text entry field over Internet 116 to Q&A server 108. Q&A server 108 receives the content of the text entry field and recognizes those contents as a new question that is being submitted to the Q&A system. In response to this recognition, Q&A server 108 generates a new entry in Q&A DB 110. Q&A server 108 places, into the new entry, the question-indicating contents of the text entry field as received from the one of clients 114A-N that submitted those contents. Optionally, Q&A server 108 may also place, into that new entry, information that identifies the user who submitted the question to the Q&A system, thereby associating the question with the submitted user.

Additionally, one or more web pages that Q&A server 108 sends to Q&A clients 114A-N may contain additional or alternative text entry fields into which users of Q&A clients 114A-N may enter and submit question search query terms. These question search query terms should not be confused with the previously mentioned Internet search query terms that users of SE clients 112A-N submit to search engine 102; the two query types are entirely separate and are directed to entirely different servers. Upon a user's activation of a control such as a "SUBMIT" button, which may be located proximately to the question text entry field, the one of Q&A clients 114A-N that the user is using submits the contents of the text entry field over Internet 116 to Q&A server 108 within an HTTP request. Q&A server 108 receives the contents of the text entry field and recognizes those contents as a query for existing questions (and accompanying answers) stored within the Q&A system.

In response to this recognition, Q&A server 108 searches an index that is built on the contents of Q&A DB 110. Generally speaking, Q&A server 108 determines a set of entries, in Q&A DB 110, that match the user-submitted contents of the text entry field. Thus, Q&A server 108 determines a set of questions, previously submitted by other users of the Q&A system, or, as will be seen below, harvested and generated using other techniques, which are relevant to the question search query terms submitted by a user of one of clients 114A-N. Q&A server 108 dynamically generates a question search results web page that contains references to some subset of the questions determined to be most relevant to the question search query terms. Within this question search results web page, each question search result may contain a hypertext link to some other web page within the Q&A system that corresponds specifically to that search result's question. Q&A server 108 sends the question search results web page over Internet 116 as an HTTP response to the one of Q&A clients 114A-N from which Q&A server 108 received the question search query terms.

Q&A clients 114A-N receive such question search results web pages over Internet 116 from Q&A server 108. Q&A clients 114A-N render those question search results web pages to their users. A user of one or Q&A clients 114A-N may mouse-click on a particular hypertext link within such a question search results web page. In response, that one of Q&A client 114A-N requests, from Q&A server 108, over Internet 116, a question web page that corresponds specifically to the question whose hypertext link the user mouse-clicked. Each question stored within Q&A DB 110 may be associated with a separate question web page that pertains to that question and no other question within Q&A DB 110. Q&A server 108 may dynamically generate such question web pages in response to requests from Q&A clients 114A-N.

Q&A server 108 receives such a request for a question web page over Internet 116. In response, Q&A server 108 locates the corresponding question within Q&A DB 110. The entry for the question within Q&A DB 110 may also point to one or more answer entries corresponding to the question's entry within Q&A DB 110. Such answers typically will have been submitted to the Q&A system over Internet 116 from various different ones of Q&A clients 114A-N; an example of a technique through which such answers may be submitted to the Q&A system is described further below. The answers stored in association with a particular question typically will have been submitted to the Q&A system by users other than the user who submitted the particular question to the Q&A system. Q&A server 108 dynamically generates a question web page that indicates (a) the question and (b) one or more previously submitted answers to the question, if any have been submitted for that question. The question web page also may contain a text entry field that is designated as being a receptacle for a new answer to the question. Q&A server 108 sends the question web page over Internet 116 as an HTTP response to the one or Q&A clients 114A-N that requested the question web page (e.g., via that client's user having previously mouse-clicked on the corresponding question's hypertext link within a question search results web page).

After Q&A clients 114A-N receive and render such question web page pages to their users, those users can submit new answers to the corresponding questions via the text entry fields contained in those question web pages. Q&A clients 114A-N submit such new answers over Internet 116 to Q&A server 108. In response to receiving a new answer from one of Q&A clients 114A-N in this manner, Q&A server generates a new answer entry in Q&A DB 110, stores the user-submitted answer within that new answer entry, and stores an association between that new answer entry and the question entry for the question in response to which the new answer was submitted. Thus, the new answer becomes associated with the existing question. Other users of Q&A clients 114A-N who request and receive a question web page for the same question will see, on that question web page, all of the answers previously submitted in response to that question, including the new answer discussed above. Thus, Q&A DB 110 gradually comes to contain more and more questions and more and more answers to those questions. Some answers might be correct, while others might not be.

As is discussed above, one way in which a question may be added to Q&A DB 110 is via a user of any of Q&A clients 114A-N intentionally submitting that question to Q&A server 108 through a user interface within a web page that Q&A server 108 provided to that Q&A client over Internet 116. However, according to an embodiment of the invention, another technique for building content within Q&A DB 110 is additionally used. In such an embodiment of the invention, some question-harvesting process, which might be continuously executed by some computer that is associated with either the Q&A system or search engine 102, continuously or periodically examines query log 118. It should be noted that query log 118 contains Internet search queries that SE clients 112A-N previously submitted to search engine 102; query log 118 does not contain question search queries that Q&A clients 114A-N submitted to Q&A server 108. The question-harvesting process determines whether any new queries have been stored in query log 118 since the last time that the question-harvesting process examined query log 118. For each new query that has been added to query log 118 since the last time that the question-harvesting process examined query log 118, the question-harvesting process determines whether that new query either (a) actually expresses a question or (b) could be modified to express a question. Techniques for determining whether such a new query is or could express a question are well-known. For example, the question-harvesting process may conclude that any query that ends with (or even contained, anywhere) a question mark actually expresses a question. For another example, the question-harvesting process may conclude that any query that begins with any of the words "who," "what," "where," "when," "why," "how," "is," "do," "does," "has," "was," "can," "will," "did," "could," "would," "should," "which," or "whose" expresses or could be modified to express a question regardless of whether that query ends with or contains a question mark.

Example techniques for determining whether a query actually does contain, or could be modified to contain, a question are further described in "Web-Based Unsupervised Learning for Query Formulation in Question Answering" by Yi-Chia Wang, Jian-Cheng Wu, Tyne Liang, and Jason S. Chang, which was published in "Natural Language Processing—IJCNLP 2005," which is incorporated by reference herein. Although the foregoing examples pertain to techniques for determining when questions appear within English-language queries, alternative embodiments of the invention may use similar techniques for determining when questions appear within non-English-language queries. In such alternative embodiments, the words used as hints to determine that a question is present in a query, and the locations of those words in the query, and the identities and locations of punctuation that provide such hints, may differ from those used in the English-language-based technique. However, it should be understood that each natural language, written or spoken, contains words and/or punctuation that may be used to determine that a query likely contains a question.

According to an embodiment of the invention, for each question-expressing query entry (and, in one embodiment of the invention, for each query that could be modified to contain a question) discovered in query log 118 since the last time that the question-harvesting process examined query log 118, the question-harvesting process generates a new question based on the contents of the query entry. For example, the question-harvesting process may capitalize the first word of the query, re-order words of the query, add articles (such as "the," "a," "an," etc.) to the query, add a question mark to the end of the query if none exists, etc. In one embodiment of the invention, the question-harvesting process performs operations relative to the query which cause the query to be expressed with proper grammar and spelling according to the protocols of some natural language (e.g., English). Example techniques for correcting grammar within a query are disclosed in "Automatic Grammar Correction For Second-Language Learners" by John Lee and Stephanie Seneff, which was presented at Interspeech 2006 (Pittsburgh, Pa., September 17-21), and is incorporated by reference herein. Regardless of the kind of formatting and correction performed relative to the newly generated question, the question-harvesting process adds the newly generated question to Q&A DB 110 in a new question entry. In one embodiment of the invention, the question-harvesting process first determines whether an identical or highly similar (e.g., based on the percentage of same words) question already exists in Q&A DB 110, and, if one does, then the question-harvesting process refrains from adding an entry for the newly generated question in Q&A DB 110.

Thereafter, users of the Q&A system will see the newly added question within a question search results page generated by Q&A server 108 whenever the question search terms submitted by Q&A clients 114A-N are relevant to the newly added question. A user of Q&A client 114A-N may click on a hypertext link corresponding to the newly added question in order to see the question web page for the newly added question. The Q&A system does not need to provide any indication to users of Q&A clients 114A-N that the question was harvested from query log 118 rather than being submitted to Q&A server 108 through more conventional means by one of the users of Q&A clients 114A-N. Viewers of the question web page for the newly added question may submit answers to that question in the same manner that those viewers can submit answers to any other question contained within Q&A DB 110. Such user-submitted answers are stored in association with the newly added question in Q&A DB 110 in the same manner that any other user-submitted answers are. Such user-submitted answers are displayed as answers to the newly added question on the newly added question's web page.

Thus, according to techniques described herein, the content contained within Q&A DB 110 may be augmented and supplemented automatically using Internet search queries submitted to search engine 102. Users who submit such Internet search queries to search engine 102 might not be aware of, and have no need to be aware of, the existence of Q&A server 108 or any aspect of the Q&A system. Beneficially, the query-log-question-harvesting techniques described herein make the experience of users of the Q&A system richer and more rewarding, as those users are more likely to find questions in which they are interested, and answers that other users of the Q&A system submit to those questions. The content of Q&A DB may be grown even if few users interact with Q&A server 108, and even if new questions are only rarely submitted to Q&A server 108 through user interfaces. Because users of search engine 102 are increasingly likely to submit queries that express questions to search engine 102, the techniques described herein are ideal for generating new questions for storage in Q&A DB 110.

Additionally, users of search engine 102 who submit question-expressing queries as queries to search engine 102 may be pleased to find that the search results web pages returned by search engine 102 may refer to question web pages within the Q&A system (also indexed by web crawler 104 into search corpus 106) that contain user-submitted answers to the questions expressed by users of search engine 102. This further increases the exposure of the Q&A system and encourages increased use of the Q&A system by users who might not have been familiar with the Q&A system previously.

A further example of the operation of certain components of FIG. 1 is described below.

Example Flows

Figure 2:
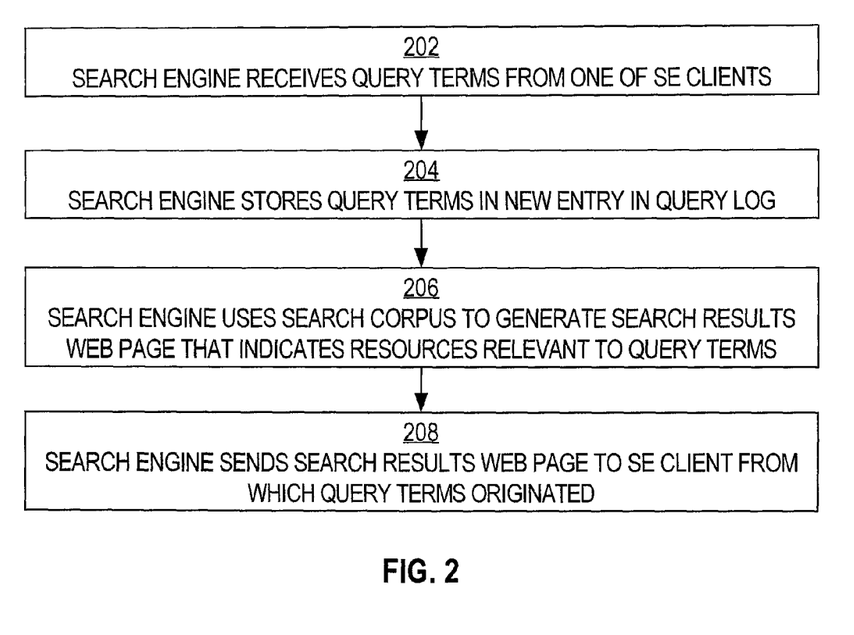
FIG. 2 depicts an example of a technique by which an Internet search query is stored in a search engine's query log, according to an embodiment of the invention.

FIG. 2 depicts an example of a technique by which an Internet search query is stored in a search engine's query log, according to an embodiment of the invention. In block 202, search engine 102 receives query terms from one of SE clients 112A-N. In block 204, search engine 102 stores the query terms in a new entry in query log 118. In block 206, search engine 102 uses search corpus 106 to generate a search results web page that indicates resources that are relevant to the query terms. In block 208, search engine 102 sends the search results web page to the one or SE clients 112A-N from which the query terms originated.

Figure 3:
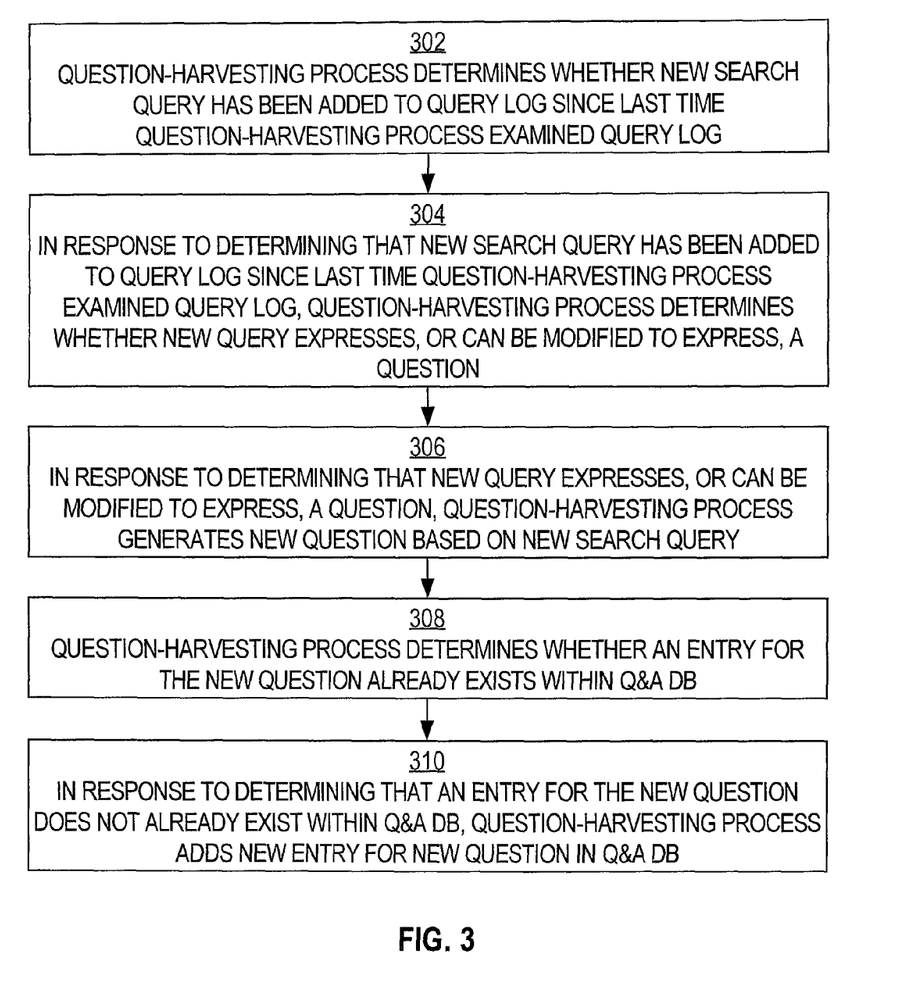
FIG. 3 depicts an example of a technique by which a question-harvesting process automatically supplements question content contained in a Q&A system's question database based on Internet search engine queries contained in a query log, according to an embodiment of the invention.

FIG. 3 depicts an example of a technique by which a question-harvesting process automatically supplements question content contained in a Q&A system's question database based on Internet search engine queries contained in a query log, according to an embodiment of the invention. In block 302, the question-harvesting process determines whether a new search query has been added to query log 118 since the last time that the question-harvesting process examined query log 118. In block 304, in response to determining that a new search query has been added to query log 118 since the last time that the question-harvesting process examined query log 118, the question-harvesting process determines whether the new search query expresses, or can be modified to express, a question. In block 306, in response to determining that the new search query expresses, or can be modified to express, a question, the question-harvesting process generates a new question based on the new search query. In block 308, the question-harvesting process determines whether an entry for the new question already exists within Q&A DB 110. In block 310, in response to determining that no entry yet exists for the new question in Q&A DB 110, the question-harvesting process adds a new entry for the new question in Q&A DB 110. The new entry contains the new question. Thereafter, users of the Q&A system may view the new question and submit answers to the new question if they wish.

Hardware Overview

Figure 4:
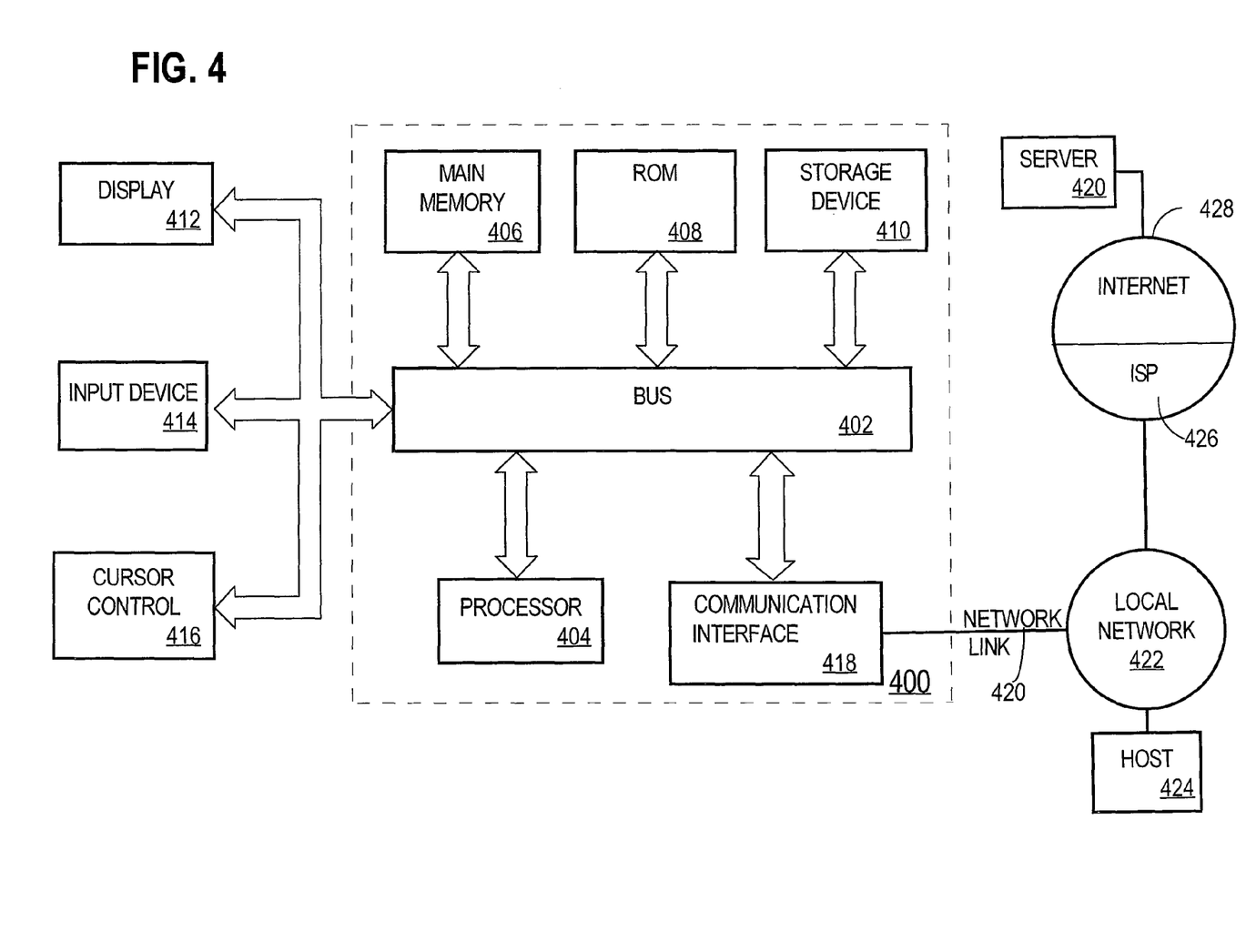
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" (or "computer-readable medium") as used herein refers to any medium that participates in providing data that causes a machine (or computer) to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. Volatile and non-volatile media are non-transitory media.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
    locating, within a stored log of queries that were previously submitted to a search engine, a log entry that specifies query terms; and
    in response to locating said log entry, adding, to a stored set of questions that is maintained by a question-and-answer system that is separate from the search engine, a new question that is based on said query terms;
    based on the new question being present in the stored set of questions, presenting to a first user of the question-and-answer system a web page that contains the new question, an answer to the new question that was provided by a second user, and a mechanism by which the first user may post another answer to the new question;
    wherein the method is performed by one or more computing devices.

2. The method of claim 1, wherein the new question was not submitted to the question-and-answer system by any human user.

3. The method of claim 1, further comprising:
    the search engine, in response to receipt of said query terms:
        (a) determining a set of media items that are relevant to said query terms, and
        (b) returning, to a submitter of said query terms, a web page that specifies references to one or more media items within the set of media items.

4. The method of claim 3, wherein the question-and-answer system does not determine said set of media items.

5. The method of claim 3, wherein said determining said set of media items is based, at least in part, on said search engine selecting, from a corpus of Internet-accessible web pages, one or more web pages, each of which contains one or more of said query terms.

6. The method of claim 1, wherein the stored set of questions contains one or more questions that one or more human users submitted directly to said question-and-answer system.

7. The method of claim 1, further comprising:
    receiving, through said mechanism, information from the first user indicating an indicated answer for the new question;
    storing the indicated answer in association with the new question;
    after storing the indicated answer in association with the new question, presenting to
        a user of the question-and-answer system a web page that contains the new question and the indicated answer based on the new question being present in the stored set of questions.

8. A computer-implemented method comprising steps of:
    automatically harvesting a particular question from query logs specifying queries previously submitted to an Internet search engine that (a) is separate from an online question-and-answer system and (b) returns relevance-ranked references to web pages that contain terms of said queries;
    the question-and-answer system presenting the particular question to a first human user;
    receiving, over the Internet, at the question-and-answer system, a first answer that the first human user submitted in response to the particular question;
    storing the first answer in association with the particular question; and
    sending, over the Internet, to a second human user, a web page that specifies both said particular question and said first answer;
    wherein said particular question was not submitted to said question-and-answer system by any human user; and
    wherein the method is performed by one or more computing devices.

9. The method of claim 8, further comprising:
    said question-and-answer system presenting the particular question to a third human user;
    receiving, over the Internet, at said online question-and-answer system, a second answer that the third human user submitted in response to the particular question;
    storing the second answer in association with the particular question; and
    sending, over the Internet, to a fourth human user, a web page that specifies (a) said particular question, (b) said first answer, and (c) said second answer.

10. The method of claim 8, wherein said automatically harvesting said particular question from query logs further comprises:
    searching said query logs for previously submitted queries that specify questions;
    in response to finding, in said query logs, a particular previously submitted query that specifies said particular question, adding said particular question to a stored question set that contains one or more questions that one or more users submitted directly to said question-and-answer system through an interface provided by said question-and-answer system;

wherein said particular previously submitted query was submitted to said Internet search engine by a third human user who is separate from both the first and second human users.

11. A non-transitory computer-readable storage medium that stores instructions which, when executed by one or more processors, cause:

locating, within a stored log of queries that were previously submitted to a search engine, a log entry that specifies query terms; and in response to locating said log entry, adding, to a stored set of questions that is maintained by a question-and-answer system that is separate from the search engine, a new question that is based on said query terms;

based on the new question being present in the stored set of questions, presenting to a first user of the question-and-answer system a web page that contains the new question, an answer to the new question that was provided by a second user, and a mechanism by which the first user may post another answer to the new question.

12. The computer-readable medium of claim 11, wherein the new question was not submitted to the question-and-answer system by any human user.

13. The computer-readable medium of claim 11 further comprising instructions for:

the search engine, in response to receipt of said query terms:
  (a) determining a set of media items that are relevant to said query terms, and
  (b) returning, to a submitter of said query terms, a web page that specifies references to one or more media items within the set of media items.

14. The computer-readable medium of claim 13, wherein the question-and-answer system does not determine said set of media items.

15. The computer-readable medium of claim 13, wherein said determining said set of media items is based, at least in part, on said search engine selecting, from a corpus of Internet-accessible web pages, one or more web pages, each of which contains one or more of said query terms.

16. The computer-readable medium of claim 11, wherein the stored set of questions contains one or more questions that one or more human users submitted directly to said question-and-answer system.

17. The computer-readable medium of claim 11, further comprising instructions for:

receiving, through said mechanism, information from the first user indicating an indicated answer for the new question;

storing the indicated answer in association with the new question;

after storing the indicated answer in association with the new question, presenting to a user of the question-and-answer system a web page that contains the new question and the indicated answer based on the new question being present in the stored set of questions.

18. A non-transitory computer-readable storage medium that stores instructions which, when executed by one or more processors, cause:

automatically harvesting a particular question from query logs specifying queries previously submitted to an Internet search engine that (a) is separate from an online question-and-answer system and (b) returns relevance-ranked references to web pages that contain terms of said queries;

the question-and-answer system presenting the particular question to a first human user;

receiving, over the Internet, at the question-and-answer system, a first answer that the first human user submitted in response to the particular question;

storing the first answer in association with the particular question; and sending, over the Internet, to a second human user, a web page that specifies both said particular question and said first answer;

wherein said particular question was not submitted to said question-and-answer system by any human user.

19. The computer-readable medium of claim 18, further comprising instructions for:

said question-and-answer system presenting the particular question to a third human user;

receiving, over the Internet, at said online question-and-answer system, a second answer that the third human user submitted in response to the particular question;

storing the second answer in association with the particular question; and sending, over the Internet, to a fourth human user, a web page that specifies (a) said particular question, (b) said first answer, and (c) said second answer.

20. The computer-readable medium of claim 18, wherein said automatically harvesting said particular question from query logs further comprises:

searching said query logs for previously submitted queries that specify questions;

in response to finding, in said query logs, a particular previously submitted query that specifies said particular question, adding said particular question to a stored question set that contains one or more questions that one or more users submitted directly to said question-and-answer system through an interface provided by said question-and-answer system;

wherein said particular previously submitted query was submitted to said Internet search engine by a third human user who is separate from both the first and second human users.

* * * * *